Nov. 27, 1951     A. G. PERKINS     2,576,808
CONTROL DEVICE FOR MILKING MACHINES
Filed Nov. 30, 1950
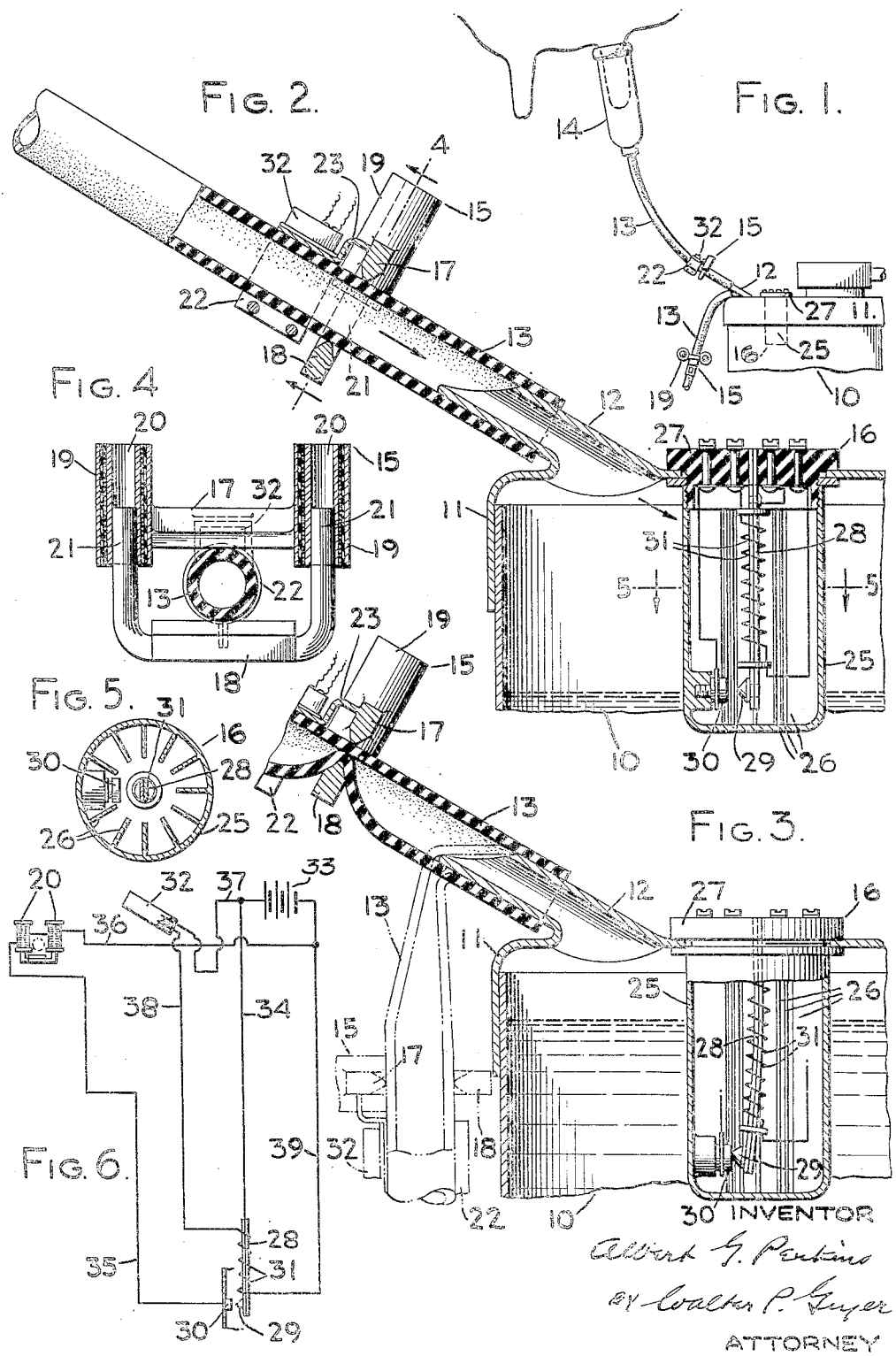
INVENTOR
Albert G. Perkins
by Walter P. Guyer
ATTORNEY Patented Nov. 27, 1951

2,576,808

UNITED STATES PATENT OFFICE 2,576,808

CONTROL DEVICE FOR MILKING MACHINES

Albert G. Perkins, Grand Island, N. Y.

Application November 30, 1950, Serial No. 198,353

10 Claims. (Cl. 119—14.08)

1

This invention relates generally to certain new and useful improvements in the operation of milking machines but more particularly to a control device for shutting off the vacuum to the teat cups as the respective quarters of the cow's bag are milked out and thereby prevent injury to the cow which results from leaving the machine on too long.

One of the objects of the invention is to provide a device of this character which is so designed and constructed as to control by combined thermo and electric means the shutting off of the vacuum to a teat cup when the flow of milk therethrough has substantially ceased.

Another object is to provide a thermo-electric controlled device for milking machines which is simple in construction and reliable in operation, and which employs a solenoid-operated means in operative relation to the milk flow tube of the teat connection to cause the contraction and closing of the tube, and a thermostatically-controlled switch means in the circuit of the solenoid means and in flow relation to the milk flowing from the cow to the milk-receiving can for effecting the closing of the solenoid circuit and the shutting off of the milk flow tube when the surge of milk from the companion quarter of the cow's bag has substantially ceased.

A still further object of the invention is the provision of a thermo-electrically controlled device of this character which utilizes the milk temperature to normally prevent the shutting off of the milk flow tube during the surging flow of the milk from the cow to the can but which responds to cause such shutting off of the milk flow tube when the flow of milk therethrough substantially ceases.

Other features of the invention reside in the construction and arrangement of parts hereinafter described and particularly pointed out in the appended claims.

In the accompanying drawings:

Figure 1 is a fragmentary side view of the milk-receiving can and associated teat connections of a milking machine showing my invention associated therewith. Figure 2 is an enlarged vertical section of the control device constituting my invention and showing the position of the parts when the milk is flowing from the cow to the can. Figure 3 is a similar section but with the parts in their shutting off position resulting from the flow of milk having substantially ceased. Figure 4 is a cross section taken on line 4—4, Figure 2. Figure 5 is a cross section taken on line 5—5, Figure 2. Figure 6 is a diagram of

2 the electric circuit including the operative elements of the device.

Similar characters of reference indicate corresponding parts throughout the several views.

My control device is adapted for use with any well known type of pulsating milking machine and, referring to the drawings, 10 indicates a portion of the milk-receiving can thereof whose cover 11 has intake spouts 12 radiating therefrom, each spout being connected by a flexible conduit or hose connection 13 having a teat cup 14 at its free end for detachable connection to one of the cow's teats.

In its preferred construction shown in the drawings, the control unit associated with each teat connection consists of an electrically-controlled means, indicated generally by the numeral 15, disposed in embracing relation to the teat connection and functioning as a valve to automatically shut off the vacuum to such connection by contracting it and causing the companion teat cup to drop from the cow when the companion quarter of the cow's bag is milked out, and a thermo-responsive means, indicated generally by the numeral 16, in operative circuit governing relation to said electrically-controlled valve means and in the path of flow of the milk for initiating the movement of such valve means to a closed position when the flow of milk through the connection substantially ceases.

The electrically-controlled valve means is composed of relatively contractible bar-like members 17, 18 which extend crosswise of and embrace diametrically opposite sides of the teat connection 13 and when contracted serve to draw the latter together across a transverse line from the open position shown in Figure 2 to the closed position shown in Figure 3. The bar 17 is joined at its ends to companion tubular members 19 which support the coils 20 of a pair of solenoids, while rising from the ends of the companion bar 18 are plungers 21 which are guided in the coil-bearing members 19, so that when the coils are energized the plungers move upwardly and cause the teat connection to be contracted or drawn together by the bars 17, 18 to a closed position. For facilitating the detachable mounting of this solenoid valve unit on the teat connection, a split clamping sleeve 22 is provided which is joined to the bar 17 by a connecting web 23.

The companion or thermo-responsive means 16 of my control unit is preferably applied to the can-cover 11 where it is exposed to and in the path of flow of the milk discharged from the companion intake spout 12 into the milk-receiving can. It consists of a hollow body or container 25, having radiating fins 26 thereon, suspended from the can cover by an insulated head plate 27. Depending from this head plate and into the container is a displaceable bi-metal thermostatic element 28 having a switch contact 29 at its free end adapted to make contact with a fixed switch contact 30 applied to the lower end of the container, these contacts being included in the circuit of the solenoid coils 20. Coiled about the thermostatic element 28 is an electric heating element 31 which tends to normally deflect the former toward switch closing relation with the contact 30 but which, during the flow of milk from the cow into the can, is restrained from so doing because of the temperature reducing action of the milk as it is impinged against the container 25. In other words, as long as milk is being drawn from the cow the switch contacts 29, 30 are prevented from making contact. However, when the milk ceases to flow, then these contacts close and cause the energization of the solenoid valve unit to close off the teat connection and shut off the vacuum to the companion quarter of the cow's bag. When this happens, the teat cup drops from the cow and its connection 13 assumes the position shown by dotted lines in Figure 3 with the connection folded over the oblique mouth of its intake spout 12 to shut off the vacuum at that point.

In order to restore the solenoid-controlled valve unit 15, after the release of the teat cup from the cow, to its original or open expanded position, I provide means for automatically breaking the switch contacts 29, 30 to cause the de-energization of the solenoid coils 20. By preference, this is effected by a normally closed, gravity-controlled mercury switch 32 which is included in the circuit of the heating element 31 and mounted on the teat connection 13, say on the clamping sleeve 22 of the solenoid valve unit. When the teat connection assumes the dotted line position shown in Figure 3, the mercury switch is opened, resulting in the breaking of the heating element circuit and as well the breaking of the thermo-governed contacts 29, 30 to cause the solenoid valve unit to return to its expanded position shown by full lines in Figures 2 and 4. During the milking operation, this mercury switch is closed because of the inclined position assumed by the teat connection.

In the electric circuit diagram of the control device shown in Figure 6, 33 indicates a battery or like current source having one terminal thereof connected by a wire 34 to the thermostatic element 28 on which the switch contact 29 is mounted. The companion switch contact 30 is connected by a wire 35 to the solenoid-coils 20 and the circuit is completed through a wire 36 back to the battery. A second circuit includes a branch wire 37 leading from the battery to one of the contacts of the mercury switch 32, while the companion contact thereof is connected by a wire 38 to the heating element 31 and this circuit is completed through the wire 39 back to the battery.

I claim as my invention:

1. A control device for milking machines, comprising a teat cup connection including a contractible tube section through which the milk flows from the cow to a milk-receiving can, electrically-governed means in embracing relation to said tube section to contract the same to a closed position, and switch means disposed in flow relation to the milk and included in the circuit of said tube section embracing means for rendering the same operative to contract and close the tube section when the flow of milk from the cow substantially ceases.

2. A control device for milking machines, comprising a teat cup connection including a contractible tube section through which the milk flows from the cow to a milk-receiving can, releasably contractible means in embracing-like relation to said tube section to contract the same to a closed position, and thermo-responsive means in governing relation to said contractible means and disposed in flow relation to the milk for rendering the latter operative for contraction about the tube section when the flow of milk from the cow substantially ceases.

3. A control device for milking machines, comprising a teat cup connection including a contractible tube section through which the milk flows from the cow to a milk-receiving can, electrically-governed means in embracing relation to said tube section to contract the same to a closed position, and thermo-governed switch means disposed in flow relation to the milk and included in the circuit of said tube section embracing means for rendering the same operative to contract and close the tube section when the flow of milk from the cow substantially ceases.

4. A control device for milking machines, comprising a teat cup connection including a contractible tube section through which the milk flows from the cow to a milk-receiving can, electrically-governed means in embracing relation to said tube section to contract the same to a closed position, and thermo-governed switch means applied to the can in the path of flow of the milk delivered thereto and included in the circuit of said tube section embracing means for rendering the same operative to contract and close the tube section when the flow of milk from the cow substantially ceases.

5. A control device for milking machines, comprising a teat cup connection including a contractible tube section through which the milk flows from the cow to a milk-receiving can, electrically-governed means composed of complementary solenoid elements having members in engagement with diametrically opposite sides of the tube section to contract the same to a closed position, and thermo-governed switch means disposed in flow relation to the milk and included in the circuit of said solenoid means for rendering the same operative to contract said members and close the tube section when the flow of milk from the cow substantially ceases.

6. A control device for milking machines comprising a teat cup connection including a contractible tube section through which the milk flows from the cow to a milk-receiving can, electrically-governed means in embracing relation to said tube section to contract the same to a closed position, and thermo-governed switch means disposed in flow relation to the milk and included in the circuit of said tube section embracing means for rendering the same operative to contract the tube section when the flow of milk from the cow substantially ceases, said switch means including a bi-metal displaceable element having a heating element in operative relation thereto.

7. A control device for milking machines, comprising a teat cup connection including a contractible tube section through which the milk flows from the cow to a milk-receiving can, solenoid-actuated means in contractible embracing relation to said tube section, a thermostatically-controlled switch in the path of flow of the milk and operatively connected to said solenoid-actuated means for rendering the same inoperative to contract the same during the flow of milk from the cow to the can, and a heating element in correlation to said thermostatically-controlled switch for urging the same to a closed position when the flow of milk from the cow to the can substantially ceases.

8. A control device for milking machines, comprising a teat cup connection including a contractible tube section through which the milk flows from the cow to a milk-receiving can, electrically-governed means in embracing relation to said tube section to contract the same to a closed position to shut off the vacuum to the teat cup and cause the dropping of the teat cup from the cow, thermo-governed switch means disposed in flow relation to the milk and included in the circuit of said tube section embracing means for rendering the same operative to contract the tube section when the flow of milk from the cow substantially ceases, said switch means including a bimetal displaceable element having a heating element in operative relation thereto, and a normally-closed, gravity-actuated switch included in the circuit of said heating element and applied to the tube section for movement to a switch-opening position when the teat cup is released and dropped from the cow.

9. The combination with a contractible tube section for conducting a liquid by vacuum from a source of supply to a receiving container, of electrically-controlled means in embracing relation to said tube section for contracting the same to a closed position, and switch means disposed in flow relation to the liquid flowing through the tube section and included in the circuit of its embracing means for rendering the same operative to contract and close the tube section when the flow of liquid therethrough substantially ceases.

10. The combination with a contractible tube section for conducting a liquid by vacuum from a source of supply to a receiving container, of electrically-controlled means composed of complementary solenoid elements having members in engagement with diametrically opposite sides of the tube section for contracting the same to a closed position, and switch means disposed in flow relation to the liquid flowing through the tube section and included in the circuit of said solenoid means for rendering the same operative to contract the solenoid members and close the tube section when the flow of liquid therethrough substantially ceases, said switch means being normally open and inoperative to close the solenoid circuit during the flow of liquid through the tube section.

ALBERT G. PERKINS.

REFERENCES CITED

The following references are of record in the file of this patent:

UNITED STATES PATENTS

| Number | Name | Date |
|---|---|---|
| 640,206 | Klein, et al. | Jan. 2, 1900 |
| 835,918 | Sabroe | Nov. 13, 1906 |
| 952,978 | Cramp | Mar. 22, 1910 |
| 1,962,192 | Hapgood | June 12, 1934 |
| 2,304,211 | Sparrow | Dec. 8, 1942 |